US011531997B2

(12) United States Patent
Kumar et al.

(10) Patent No.: US 11,531,997 B2
(45) Date of Patent: Dec. 20, 2022

(54) SYSTEMS AND METHODS USING FACIAL RECOGNITION FOR DETECTING PREVIOUS VISITS OF A PLURALITY OF INDIVIDUALS AT A LOCATION

(71) Applicant: Capital One Services, LLC, McLean, VA (US)

(72) Inventors: Ashwini Kumar, Brambelton, VA (US); Yazdan Shirvany, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 16 days.

(21) Appl. No.: 17/350,584

(22) Filed: Jun. 17, 2021

(65) Prior Publication Data

US 2021/0312479 A1 Oct. 7, 2021

Related U.S. Application Data

(63) Continuation of application No. 16/547,295, filed on Aug. 21, 2019, now Pat. No. 11,042,888, which is a (Continued)

(51) Int. Cl.
*G06Q 30/02* (2012.01)
*G06V 40/16* (2022.01)

(52) U.S. Cl.
CPC ..... *G06Q 30/0201* (2013.01); *G06Q 30/0204* (2013.01); *G06Q 30/0281* (2013.01); *G06V 40/173* (2022.01)

(58) Field of Classification Search
CPC ........... G06Q 30/0201; G06Q 30/0204; G06Q 30/0281; G06V 40/173
See application file for complete search history.

(56) References Cited

U.S. PATENT DOCUMENTS 5,331,344 A 7/1994 Lu et al.
6,535,855 B1 3/2003 Cahill et al.
(Continued)

FOREIGN PATENT DOCUMENTS

CN 101901461 A 12/2010
CN 109711827 A * 5/2019

OTHER PUBLICATIONS

Federal Trade Commision "Best Practices for Common Uses of Facial Recognition Technologies" (2012) (https://www.ftc.gov/sites/default/files/documents/reports/facing-facts-best-practices-common-uses-facial-recognition-technologies/121022facialtechrpt.pdf) (Year: 2012).*

*Primary Examiner* — Sujay Koneru
(74) *Attorney, Agent, or Firm* — Greenberg Traurig, LLP

(57) ABSTRACT

Systems and methods for enhancing customer service are disclosed. The system can perform operations including detecting individuals and performing facial recognition on the individuals using visitor profiles stored by a local database. The operations can further include determining known visitors and unknown visitors among the individuals. The operations can further include generating new visitor profiles for the unknown visitors, obtaining identity information for the unknown visitors, and associating the identity information of the unknown visitors with the new visitor profiles. The operations can further include accessing identify information of the known visitors, obtaining personalized information for the known visitors from a central database, and providing the personalized information to the known visitors. The operations can further include updating the existing visitor profiles and new visitor profiles based on actions of the known visitors and actions of the unknown visitors and providing the updated visitor profiles to the central database.

10 Claims, 6 Drawing Sheets

Related U.S. Application Data continuation of application No. 16/100,114, filed on Aug. 9, 2018, now Pat. No. 10,460,330.

(56) References Cited

U.S. PATENT DOCUMENTS

| | | |
|---|---|---|
| 6,892,210 B1 | 5/2005 | Erickson |
| 7,921,036 B1 | 4/2011 | Sharma et al. |
| 7,925,549 B2 | 4/2011 | Looney et al. |
| 7,962,361 B2 | 6/2011 | Ramchandani et al. |
| 8,549,001 B1 | 10/2013 | Minevski et al. |
| 9,218,813 B2 | 12/2015 | Baldwin et al. |
| 9,396,730 B2 | 7/2016 | Karpey et al. |
| 9,560,203 B2 | 1/2017 | Kay et al. |
| 9,648,171 B1 | 5/2017 | Eftekhari et al. |
| 10,460,330 B1 | 10/2019 | Kumar et al. |
| 2002/0049749 A1 | 4/2002 | Helgeson |
| 2003/0018522 A1 | 1/2003 | Denimarck et al. |
| 2004/0001142 A1* | 1/2004 | Kumhyr ............... G06V 20/52 348/E7.086 |
| 2006/0112427 A1 | 5/2006 | Shahbaz |
| 2007/0140532 A1 | 6/2007 | Goffin |
| 2007/0174272 A1 | 7/2007 | Carter et al. |
| 2008/0249793 A1 | 10/2008 | Angell et al. |
| 2008/0249838 A1 | 10/2008 | Angell et al. |
| 2008/0249857 A1 | 10/2008 | Angell et al. |
| 2008/0249867 A1 | 10/2008 | Angell et al. |
| 2009/0157472 A1 | 6/2009 | Burazin et al. |
| 2010/0066822 A1 | 3/2010 | Steinberg |
| 2012/0266191 A1 | 10/2012 | Abrahamsson et al. |
| 2012/0316963 A1* | 12/2012 | Moshfeghi ........... G06Q 20/327 705/14.58 |
| 2013/0216102 A1 | 8/2013 | Ryan et al. |
| 2013/0250181 A1 | 9/2013 | Zhang |
| 2014/0269425 A1 | 9/2014 | Fisher |
| 2014/0283125 A1 | 9/2014 | Stanley |
| 2014/0363059 A1 | 12/2014 | Hurewitz |
| 2015/0081581 A1 | 3/2015 | Gishen |
| 2015/0088603 A1 | 3/2015 | Romero |
| 2016/0023665 A1 | 1/2016 | Sherony |
| 2016/0063313 A1 | 3/2016 | Sandholm |
| 2016/0155156 A1 | 6/2016 | Gopal et al. |
| 2016/0162910 A1 | 6/2016 | Pradhan et al. |
| 2016/0189174 A1 | 6/2016 | Heath |
| 2016/0321633 A1 | 11/2016 | Chandrasekaran et al. |
| 2017/0017834 A1 | 1/2017 | Sabitov |
| 2017/0024945 A1 | 1/2017 | Shalev |
| 2017/0178245 A1 | 6/2017 | Rodkey |
| 2017/0337602 A1 | 11/2017 | Davis |
| 2017/0353605 A1 | 12/2017 | Dumaine et al. |
| 2018/0032997 A1 | 2/2018 | Gordon |
| 2018/0047230 A1 | 2/2018 | Nye |
| 2018/0129874 A1 | 5/2018 | Baumann |
| 2018/0176017 A1 | 6/2018 | Rodriguez |
| 2018/0189769 A1 | 7/2018 | Narasimhan |
| 2018/0308100 A1 | 10/2018 | Haukioja |

* cited by examiner

SYSTEMS AND METHODS USING FACIAL RECOGNITION FOR DETECTING PREVIOUS VISITS OF A PLURALITY OF INDIVIDUALS AT A LOCATION

BACKGROUND

In the past, retailers, merchants, and other such shopkeepers frequently had a personal relationship with the individuals that visited their premises, i.e., their customers. As a result, a shopkeeper typically knew a customer's name and other personal information, such as their age, address, family, hobbies, career, important dates (e.g., anniversaries, birthdays, etc.) and personal preferences. The shopkeeper could use the customer's personal information to cater to the customer and to promote sales of items the customer might desire to purchase. The shopkeeper may also have been familiar with the customer's character and reputation (e.g., credit history, honesty, and criminal history). Based on such knowledge, the shopkeeper could determine whether to offer the customer certain marketing, coupons, and credit benefits. However, with the ever-increasing size, transient nature, and density of populations, shopkeepers now often do not recognize regular customers, much less know their names and personal information. Consequently, shopkeepers cannot take advantage of such information during interactions with customers. Thus, there is a need to improve the ability of retailers, merchants, and other such shopkeepers to identify customers and access their personal information to improve customer interactions.

SUMMARY

Implementations consistent with the present disclosure provide a system for enhancing customer service. The system can include an image sensor, a local visitor profile database, and an input/output device. The system can also include a processor connected to the image sensor, the local visitor profile database, and the input/output device. The system can further include a computer-readable data storage device, connected to the processor and storing program instructions. The program instructions, when executed by the processor, can control the system to perform operations including detecting individuals at a location using the image sensor. The operations can also include performing facial recognition on the individuals using visitor profiles stored by the local visitor profile database. The operations can further include determining, based on the facial recognition, known visitors and unknown visitors among the individuals. The operations can further include generating new visitor profiles for the unknown visitors. The operations can further include obtaining identity information for the unknown visitors using the input/output device. The operations can further include associating the identity information of the unknown visitors with the new visitor profiles. The operations can further include accessing identify information of the known visitors based on the visitor profiles stored by the local visitor profile database. The operations can further include obtaining personalized information for the known visitors from a central profile database based on the identify information of the known visitors. The operations can further include providing the personalized information to the known visitors using the input/output device. The operations can further include updating the existing visitor profiles and new visitor profiles based on actions of the known visitors in the area and actions of the unknown visitors in the area. The operations can further include providing the updated visitor profiles to the central computing system.

Additionally, implementations consistent with the present disclosure provide a method for enhancing customer service. The method can include monitoring a predefined area using image sensors. The method can also include detecting individuals within the predefined area using the image sensors. The method can further include identifying known visitors using facial recognition based on existing visitor profiles stored by a local visitor profile database. The method can further include identifying unknown visitors using the facial recognition based on an absence of any corresponding visitor profile stored by the local visitor profile database. The method can further include obtaining identity information of the unknown visitors using an input/output device. The method can further include generating new visitor profiles of the unknown visitors in the local visitor profile database using the identity information of the unknown visitors. The method can further include associating the identity information of the unknown visitors with the new visitor profiles. The method can further include obtaining personalized information for the known visitors from a central profile database based on the identity information of the known visitors. The method can further include providing the personalized information to the known visitors using the input/output device. The method can further include creating updated visitor profiles by updating the existing visitor profiles and the new visitor profiles based on actions of the known visitors in the area and the unknown visitors in the area. The method can further include providing the updated visitor profiles to the central computing system.

Moreover, implementations consistent with the present disclosure provide a system for enhancing customer service. The system can include client computer systems at locations separate from each other. The client computer systems can include one or more image sensors, facial recognition systems, input/output devices, and local visitor profile databases. The system can also include a central computing system communicatively linked to the plurality of client computer systems and including a central profile database. The client computing systems can perform operations including detecting individuals at the respective locations. The operations of the client computing system can also include performing facial recognition on the individuals using visitor profiles locally respectively stored at the client computing systems. The operations of the client computing system can further include determining known visitors and unknown visitors using the facial recognition systems. The operations of the client computing system can further include determining identity information of the known visitors based on existing visitor profiles locally stored at the client computing systems. The operations of the client computing system can further include obtaining identity information of the unknown visitors at the respective locations using the respective input/output devices. The operations of the client computing system can further include generating new visitor profiles in the respective local visitor profile databases using the identity information of the unknown visitors. The operations of the client computing system can further include creating updated visitor profiles by updating the existing visitor profiles and new visitor profiles based on actions of the individuals at the respective locations. The operations of the client computing system can also include providing the updated visitor profiles to the central computing system. The central computing system can perform operations including receiving the updated visitor profiles from the plurality of remote computing systems. The updated visitor profiles can include the existing visitor profiles and new visitor profiles. The operations of the central computing system can further include updating the central profile database with the updated visitor profiles. The operations of the central computing system can also include updating the respective local visitor profile databases of the client computing systems with the updated visitor profiles of the central profile database.

DRAWINGS

The present invention will become more fully understood from the detailed description and the accompanying drawings, wherein.

DETAILED DESCRIPTION

The present disclosure is generally related to facial recognition information processing, and, more specifically, to methods, apparatuses, and computer program products for processing facial recognition information obtained from different remote locations. Implementations of the methods, apparatuses, and computer program products disclosed herein provide for coordination of profiles that include facial recognition information among a number of remote computing systems. Each of the remote computing systems can independently and locally perform facial recognition without using any remote or centralized processing of the facial recognition information. As such, implementations consistent with the present disclosure provide a particular, technically advantageous computer architecture that decentralizes processing of the facial recognition information. This architecture reduces network bandwidth used in facial recognition processing by minimizing an amount of information transferred between the various remote computing systems and a central computing system. The architecture also reduces processing demands (e.g., processor cycles, capacity, and energy) placed on the central computing system by the remote computing systems, especially in implementations including large numbers of remote computing systems monitoring larger numbers of individuals.

Figure 1:
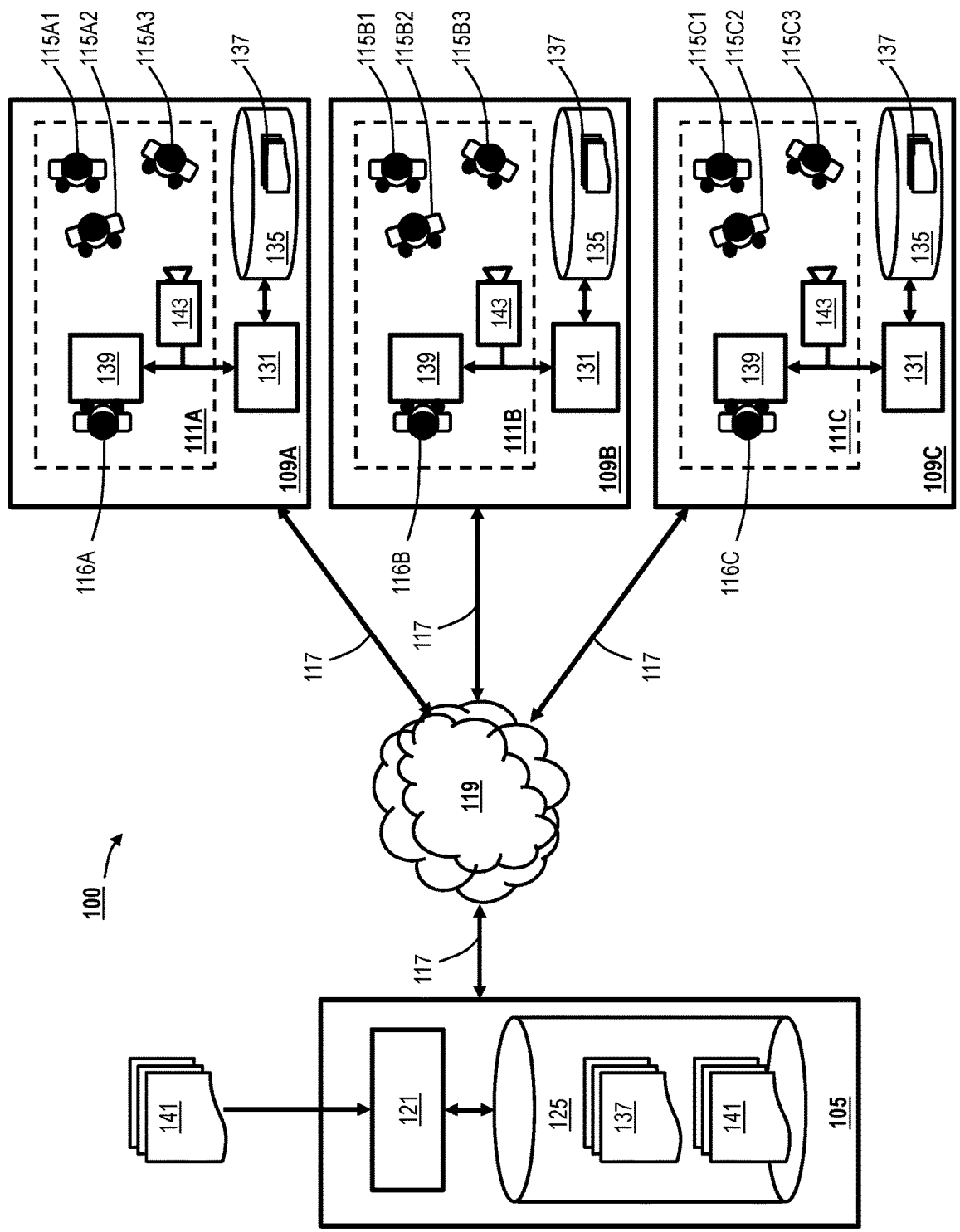
FIG. 1 shows a block diagram illustrating an example of an environment for implementing systems and processes in accordance with aspects of the present disclosure.

FIG. 1 shows a block diagram illustrating an example of an environment 100 for implementing systems and processes in accordance with aspects of the present disclosure. The environment 100 can include a central computing system 105 and a number of remote computing systems 109 (e.g., 109A . . . 109C), and remote locations 111 (e.g., 111A . . . 111C). Additionally, the environment 100 can include one or more communications channels 117 (e.g., wired or wireless communication links) and one or more networks 119 (e.g., local area networks, wide area networks, mobile communications networks, and the Internet) communicatively and operatively linking the central computing system 105 with remote computing systems 109.

The remote locations 111 can be areas occupied or visited by individuals 115 (e.g., individuals 115A1 . . . 115C3). In some implementations, the remote locations 111 can be commercial spaces, such as a retail store, a financial institution, a service center, or the like. Additionally, the remote locations 111 can be staffed by one or more merchants, shopkeepers, service clerks, or other such customer service representatives 116 (e.g., customer service representatives 116A . . . 116C).

The remote computing systems 109 can be one or more general-purpose or application-specific computer systems configured to identify the individuals 115 in the locations 111 using pre-stored visitor profiles 137, to update such visitor profiles 137, and to provide the updated visitor profiles 137 to the central computing system 105, and to distribute the visitor profiles 137 among the remote computing systems 109. In implementations the remote computing systems 109 can include client computers 131, local profile databases 135, one or more user input/output (I/O) devices 139, and one or more image sensors 143. The client computer 131 can be operatively and communicatively connected to the user I/O device 139, the local profile database 135, and the image sensor 143. In implementations, the client computer 131 is or includes a special-purpose system incorporating the image sensors 143 and is configured to perform facial recognition using techniques known in the art. For example, the image recognition can be performed by AWS DeepLens™ learning-enabled cameras from Amazon Web Services, Inc. of Seattle, Wash.

The local profile database 135 may store numerous visitor profiles 137 that contain data describing or representing visitors to the locations 111. For example, the visitor profiles 137 may include records including individual's 115 names and facial recognition information, in addition to other information. In some implementations, the visitor profiles 137 can include account information, previous offers, and historical activities and transactions.

The user I/O device 139 can be or include any device that enables the individuals 115 or the customer service representatives 116 or to interact with the client computer 131. The user I/O device 139 may comprise, for example, a touchscreen display, pointer device, keyboard, speech recognition hardware and capabilities, etc. The image sensors 143 can include cameras (still or video) that capture images of or otherwise detect the individuals 115 in certain areas (e.g., the areas used by customers) of the locations 111.

The central computing system 105 can include a central computing device 121 and a central profile database 125. The central profile database 125 may comprise one or more information archives that stores visitor profiles 137 of individuals 115 that have previously visited one or more of the locations 111 (i.e., known visitors). The visitor profiles 137 can include, for example, facial recognition information (e.g., facial signature data) for recognizing and identifying particular individuals 115. Additionally, the visitor profiles 137 can include account information, demographic information, purchase history information, and account history information, etc. of the individuals 115

The central computing device 121 can be one or more general-purpose or application-specific computer systems configured to function as an information hub between the central computing system 105 and the remote computing systems 109. The central computing system 105 can perform various functions for managing visitor profiles 137 shared between the remote computing systems 109, such as storing and sharing information stored in the central profile database 125. Additionally, the central computing system 105 can provide various functions and services to the remote computing systems 109. For example, in response to, as part of, or in association with a transaction by individuals 115 at remote computing systems 109, the central computing system 105 can provide personalized information 141 to the remote computing systems 109. The personalized information 141 can be information stored in association with account information of the individuals 115, which may correspond with visitor profiles 137. The personalized information 141 can be information obtained based on the visitor profile and account of the individual 115 (e.g., account history information, purchase history information, marketing information, credit information, trust information, benefit information, perk information, etc.) for a particular visiting individual 115A1 who is involved in a transaction at the I/O device 139 of the remote computing system 109A) Some or all of the personalized information 141 can also be obtained from a third-party provider (e.g., a credit tracking service, a criminal records service, or an advertising service).

In a non-limiting example consistent with some implementations consistent with the present disclosure, the locations 111 are retail spaces, such as banks, that are monitored by their respective remote computing systems 109. Using the image sensor(s) 143, a remote computing system 109A can detect the individuals 115A1 ... 115A3 in the location 111A. Some of the individuals 115, such as 115A1 and 115A2, can be known (e.g., previously identified) visitors of the bank, and some of the individuals 115A, such as individual 115A3 may not be known visitors of the bank. For instance, the individual 115A3 may be a new visitor (e.g., a first-time visitor or new customer) of the bank. Using facial recognition of images obtained by the sensors 143, the remote computing system 109A can attempt to identify each of the individuals 115A in the location 111A based on the visitor profiles 137 (e.g., using facial signature data from the profiles 137) stored in local profile database 135, where the visitor profiles 137 are respectively associated with the known individuals among the individuals 115A. In accordance with aspects of the present disclosure, the facial recognition processing is performed entirely by the remote computing system 109A (e.g., using client computer 131) solely based on the visitor profiles 137 pre-stored in the local profile database 135 of the remote computing system 109A for remote location 111A. As such, the remote computing system 109A can independently identify known visitors among the individuals 115A1 ... 115A3 at the location 111A. For example, by accessing an existing visitor profile 137 stored in the local profile database 135, the remote computing system 109A can obtain information describing or representing the identity of the known visitors. Additionally, for the individuals 115A1 ... 115A3 that the image recognition cannot identify, such as an unknown visitor 115A3, the remote computing system 109A can tag or classify them as unknown visitors and generate a new visitor profile for the unknown visitor 115A3 and store it in the visitor profiles 137 of the local profile database 135. Generating a new visitor profile 137 can include capturing unique facial features (e.g., facial signature data) using the image sensors 143 and storing such facial-recognition information in association with a temporary visitor or customer identification (e.g., an alphabetic, numeric, or alphanumeric code).

Additionally, using the image sensors 143, the remote computing system 109A can track, determine, and record information representing the actions of the individuals 115A (including the existing and unknown visitors) in the location 111A. Actions can be or include, for example, foot traffic patterns, which may be represented by information such as a time of entering the location 111A, an amount of time in the location 111A, a time of departing the location 111A, and the like. The actions can also include individuals 115 interacting with goods and displays at the location 111A, which may be represented by information describing whether or not an individual 115A1 physically picked up a merchandise item and an identity of that merchandise item. Additionally, the actions can include transactions with the customer service representative 116 (e.g., a cashier), the I/O device 139, an automated teller machine, a retail-checkout system, an information kiosk, or the like. Further, the actions can include security events, such as detecting shoplifting or leaving unattended packages. In some instances, the remote computing system 109 can obtain identity information for the unknown visitors among the individuals 115A currently in the location 111A through the actions taken by the unknown visitors, such as those described above. For example, the remote computing system 109A may obtain the identity of the unknown visitor 115A3 when the unknown visitor 115A3 provides personal identification information during an interaction with an automated teller machine ("ATM") or with a customer service representative 116 that is operating an input/output device 139 of the remote computing system 109A. The obtained identity information of the unknown visitor 115A3 can be combined with the corresponding new visitor profile so as to provide a correspondence between the identity information and the facial recognition information.

The remote computing system 109A can update the new visitor profiles and similarly update the existing visitor profiles, with information obtained from the actions and interactions of the individuals 115A in the remote locations 111A. Periodically (e.g., hourly or daily, or every few days), the remote computing systems 109 can send the updated visitor profiles 137 to the central computing system 105, which can use the updated visitor profiles 137 to update its copies in the central profile database 125. Additionally, the central computing system 105 can periodically (e.g., daily) update the local profile databases 135 of the remote computing systems 109 with the copies of the visitor profiles 137 stored by the central profile database 125. Additionally, in accordance with aspects of the present disclosure, the central computing system 105 can be selectively triggered to update the local profile database 135. For example, the remote computing system 109A provides (e.g., uploads) new or updated visitor profiles 137 to the central computing system 105, the remote computing system 109A can trigger (e.g., by sending a notification message) to the other remote computing systems 109B and 109C that informs them there is new changes in the central database 125. The remote computing systems 109B and 109C, in response to the trigger, may synchronize their local profile databases 135B and 135C by obtaining (e.g., downloading) the new or updated visitor profiles 137 from the central computing system 105.

Figure 2:
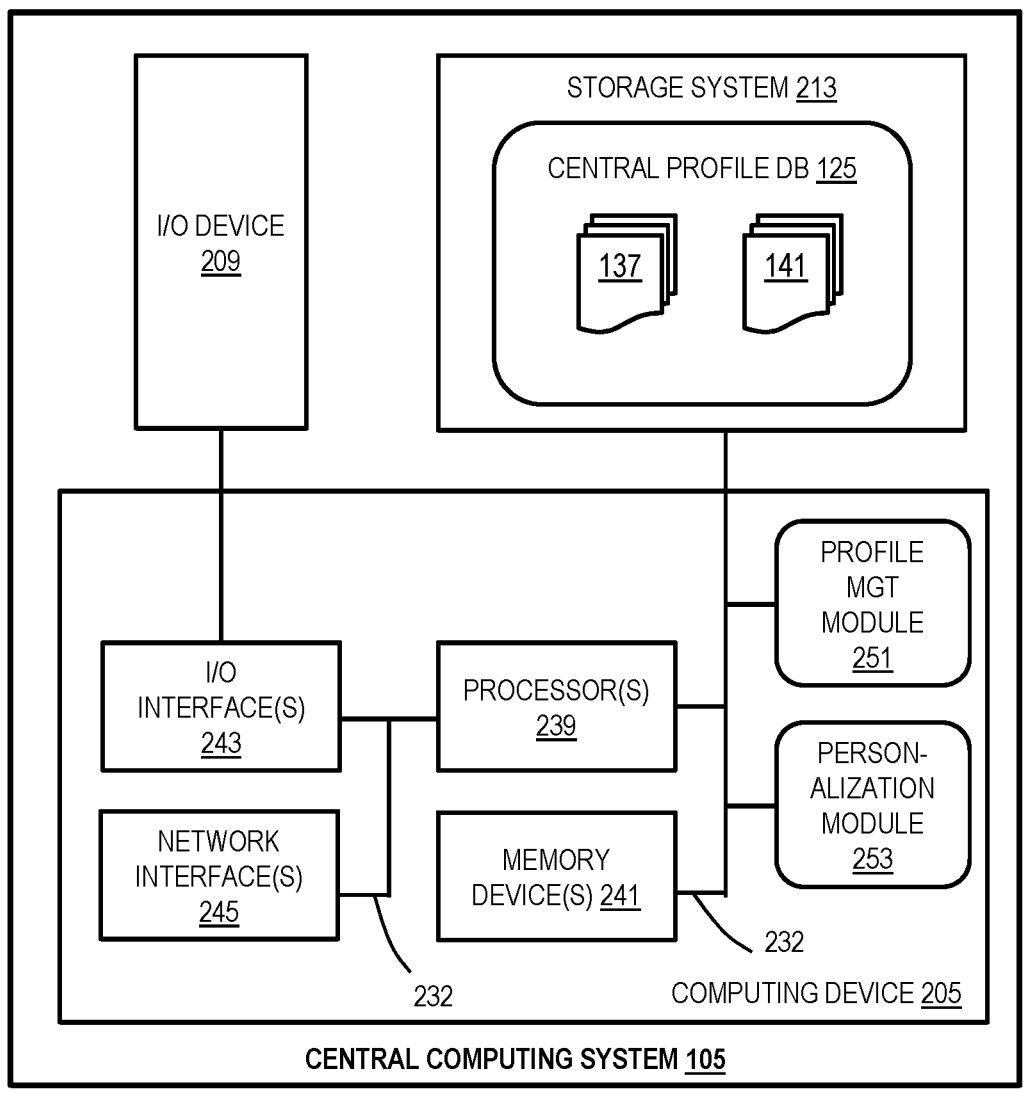
FIG. 2 shows a system block diagram illustrating an example of a central computing system in accordance with aspects of the present disclosure.

FIG. 2 shows a system block diagram illustrating an example of a central computing system 105 in accordance with aspects of the present disclosure, which can be the same or similar to that described above. The central computing system 105 can include a computing device 205, operatively and communicatively connected to an I/O device 209, and a storage system 213. The I/O device 209 can include any device that enables an individual to interact with the computing device 205 (e.g., a user interface device) and/or any device that enables the computing device 205 to communicate with one or more other computing devices using any type of communications link. The I/O device 209 can be or include, for example, a touchscreen display, pointer device, keyboard, etc. The storage system 213 may comprise a computer-readable, non-volatile hardware storage device that stores information and program instructions. For example, the storage system 213 may comprise one or more flash drives and/or hard disk drives.

In embodiments, the computing device 205 includes one or more processors 239 (e.g., microprocessor, microchip, or application-specific integrated circuit), one or more memory devices 241 (e.g., RAM and ROM), one or more I/O interfaces 243, and one or more network interfaces 245. The memory device 241 can include a local memory (e.g., a random-access memory and a cache memory) employed during execution of program instructions. Additionally, the computing device 205 can include one or more one data communication channels 232 (e.g., a data bus) by which it communicates with the I/O devices 209 and the storage system 213.

The processor 239 executes computer program instructions (e.g., an operating system and/or application programs), which can be stored in the memory device 241 and/or the storage system 213. The computer program instructions can include a profile management module 251 and a personalization module 253. The profile management module 251 can control, manage, update, and distribute visitor profiles 137, in accordance with aspects of the present disclosure. The personalization module 253 can manage personalization information 141 and provide it to the remote computing systems 109, for example, in response to request.

It is noted that the central computing system 105 may comprise any general-purpose computing article of manufacture capable of executing computer program instructions installed thereon (e.g., a personal computer, a server, etc.). However, the central computing system 105 is only representative of various possible equivalent computing devices that can perform the processes described herein. To this extent, in implementations, the functionality provided by the central computing system 105 may comprise any combination of general and/or specific purpose hardware and/or computer program instructions. In each implementation, the program instructions and hardware can be created using standard programming and engineering techniques, respectively.

Figure 3:
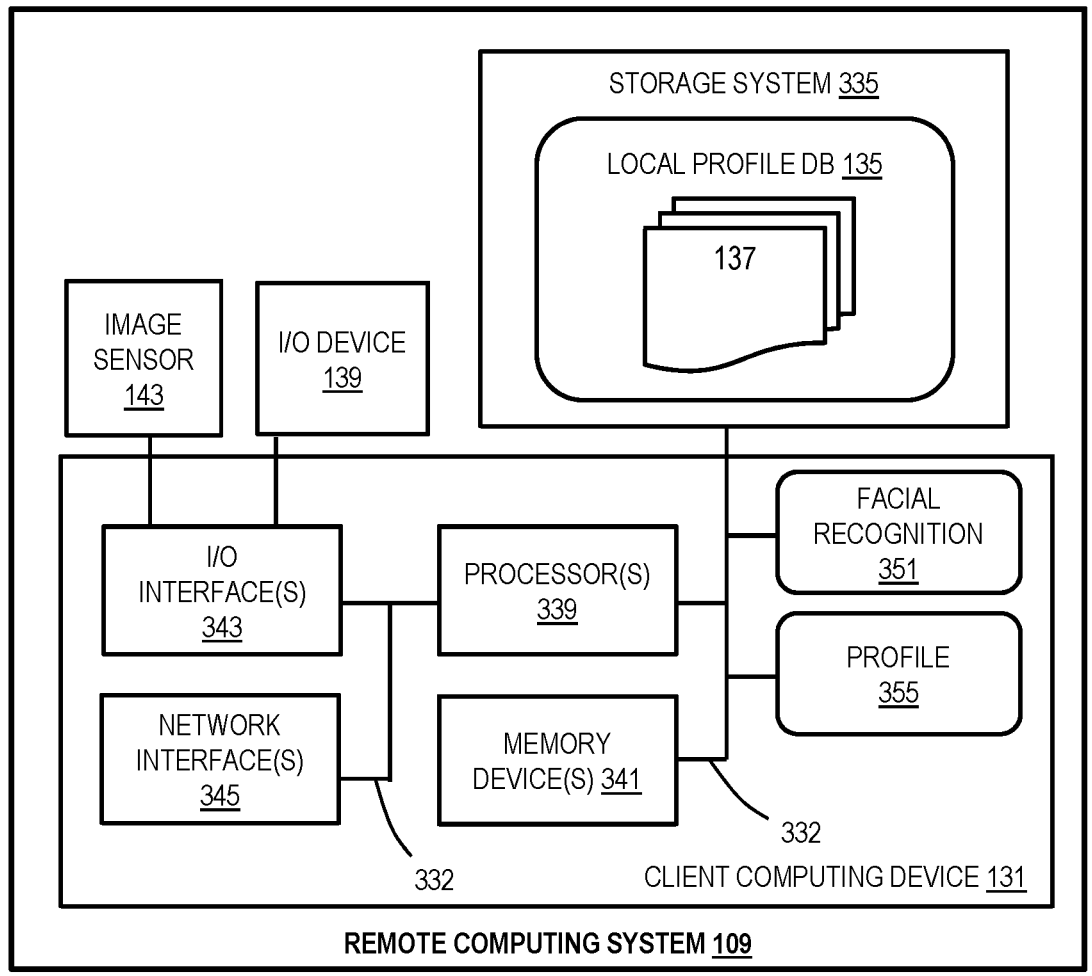
FIG. 3 shows a system block diagram illustrating an example of a remote computing system in accordance with aspects of the present disclosure.

FIG. 3 shows a system block diagram illustrating an example of a remote computing system 109 in accordance with aspects of the present disclosure, which can be the same or similar to those described above (e.g., remote computing systems 109A . . . 109C). The remote computing system 109 can include a client computing 131 operatively and communicatively connected to an I/O device 139, one or more image sensors 143, and a storage system 335. The client computing 131, the I/O device 139, and the image sensors 143 can be the same or similar to those previously described herein. The storage system 335 may comprise a computer-readable, non-volatile hardware storage device that stores information and program instructions. For example, the storage system 335 may comprise one or more flash drives and/or hard disk drives. The storage system 335 can store a local profile database 135, which can also be the same or similar to that previously described.

In embodiments, the client computer 131 includes one or more processors 339 (e.g., microprocessor, microchip, or application-specific integrated circuit), one or more memory devices 341 (e.g., RAM and ROM), one or more I/O interfaces 343, and one or more network interfaces 345. The memory device 341 can include a local memory (e.g., a random-access memory and a cache memory) employed during execution of program instructions. Additionally, the client computer 131 can include one or more one data communication channels 332 (e.g., a data bus) by which it communicates with the image sensor system 143 and I/O device 139 and the storage system 335.

The processor 339 executes computer program instructions (e.g., an operating system and/or application programs), which can be stored in the memory device 341 and/or the storage system 335. The processor 339 can also execute computer program instructions of facial recognition module 351 and profile module 355.

It is noted that the client computer 131 may comprise any general-purpose computing article of manufacture capable of executing computer program instructions installed thereon (e.g., a personal computer, a server, etc.). However, the client computer 131 is only representative of various possible equivalent computing devices that can perform the processes described herein. To this extent, in implementations, the functionality provided by the client computer 131 may comprise any combination of general and/or specific purpose hardware and/or computer program instructions. In each implementation, the program instructions and hardware can be created using standard programming and engineering techniques, respectively.

Figure 4:
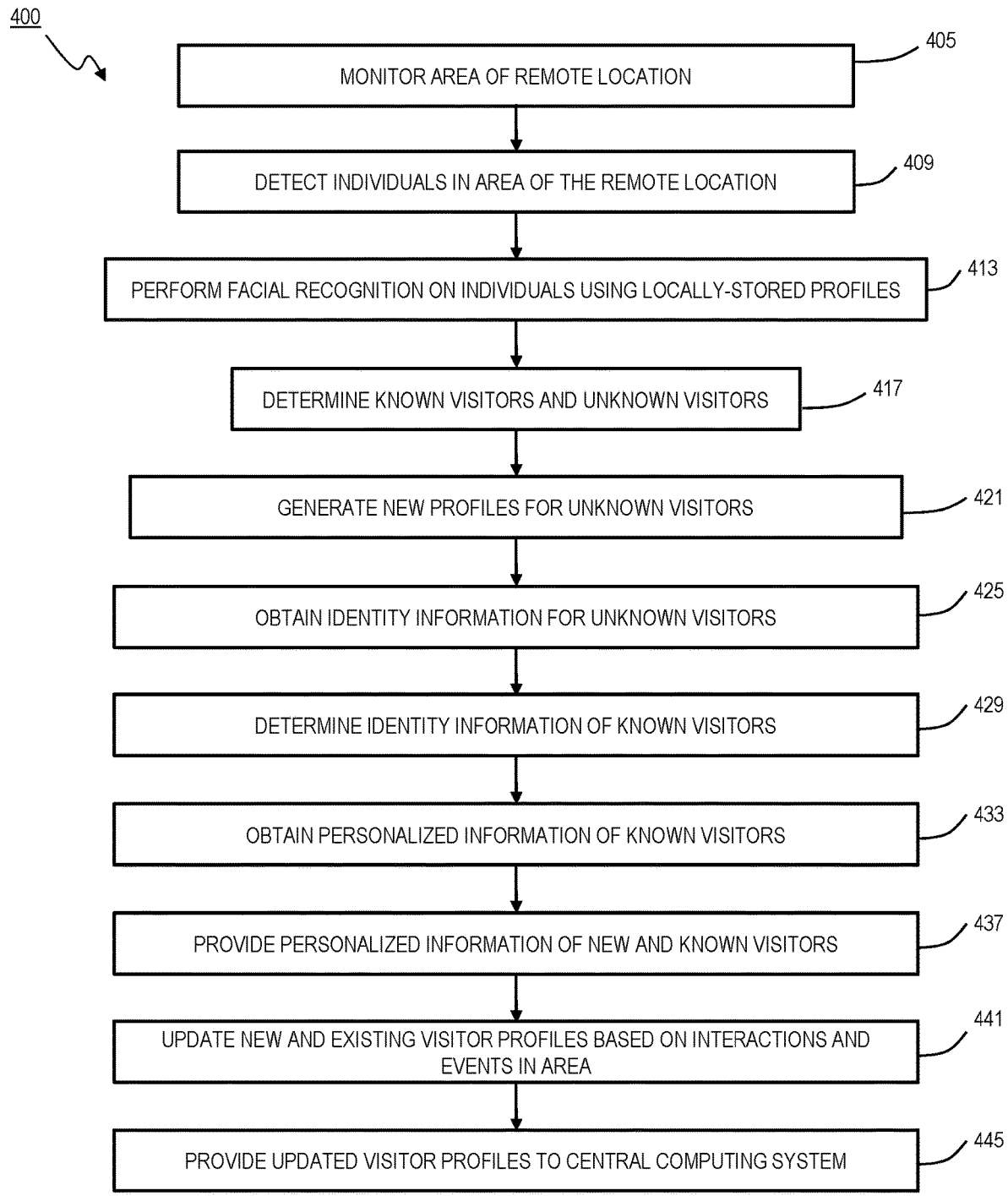
FIG. 4 shows a flow block diagram illustrating an example of a process for performing image recognition processing by a remote computing system, in accordance with aspects of the present disclosure.
Figure 5:
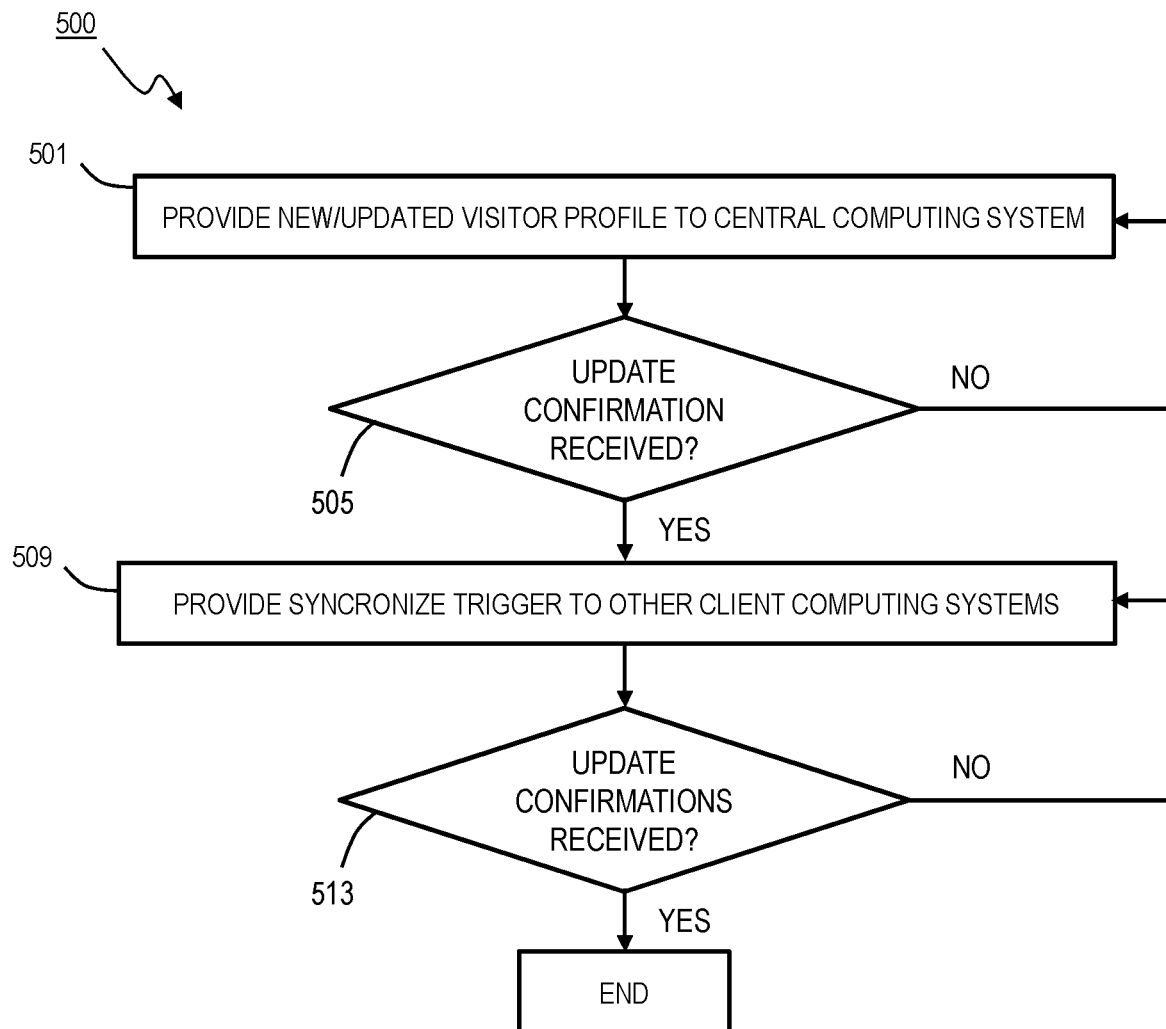
FIG. 5 shows a flow block diagram illustrating an example of a process for updating image recognition processing information of a number of remote computing systems by a central computing system, in accordance with aspects of the present disclosure.
Figure 6:
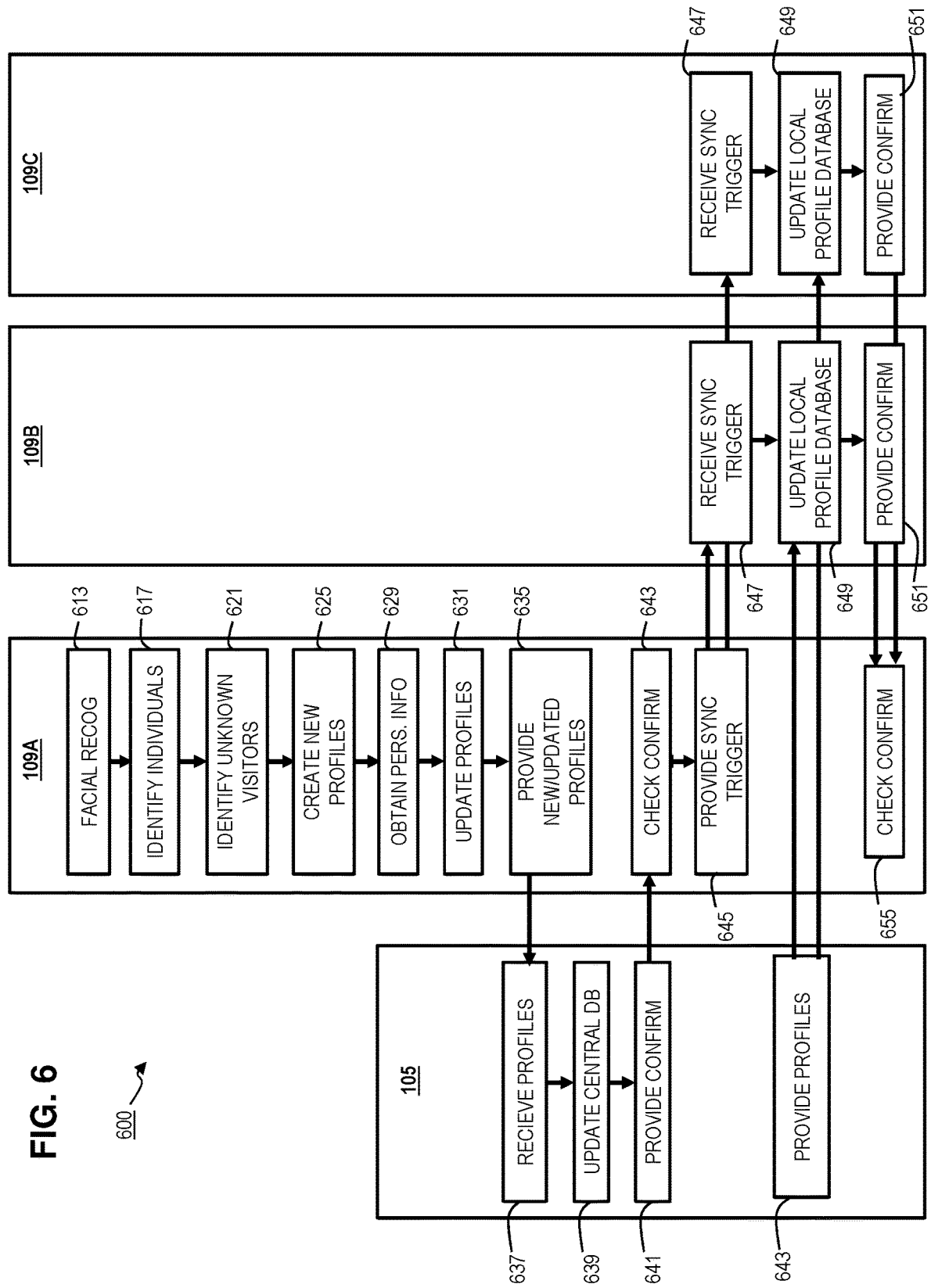
FIG. 6 shows a swim-lane flow diagram illustrating an example of a process for performing image recognition among a number of remote computing systems, in accordance with aspects of the present disclosure.

The flow diagram in FIGS. 4-6 illustrate examples of the functionality and operations of possible implementations of systems, methods, and computer program products according to various implementations consistent with the present disclosure. In various implementations, each block in the flow diagrams of FIGS. 4-6 can represent a module, segment, or portion of program instructions, which includes one or more computer executable instructions for implementing the illustrated functions and operations. In some alternative implementations, the functions and/or operations illustrated in a particular block of the flow diagram can occur out of the order shown in FIGS. 4-6. For example, two blocks shown in succession can be executed substantially concurrently, or the blocks can sometimes be executed in the reverse order, depending upon the functionality involved. It will also be noted that each block of the flow diagrams and combinations of blocks can be implemented by special purpose hardware-based systems that perform the specified functions or acts, or combinations of special purpose hardware and computer instructions.

FIG. 4 shows a flow block diagram illustrating an example of a process 400 for performing image recognition processing by remote computing systems, in accordance with aspects of the present disclosure. At 405, a remote computing system (e.g., remote computing systems 109) can monitor one or more areas of a remote location (e.g., predefined areas of the locations 111, such as areas to which customers have access) using the image sensors (e.g., image sensors 143). For example, the locations 111 can be a bank branch offices or other retail locations surveilled by one or more video cameras. In some implementations, the video cameras are embodied as one or more AWS DeepLens units specially configured for identifying people (e.g., individuals 115) using facial recognition. At 409, the remote computing system can detect individuals in the areas monitored at 405. For example, the individuals can be visitors to a bank branch who are in the customer waiting area. At 413, the remote computing system can perform facial recognition on the individuals detected at 409 using locally-stored visitor profiles (e.g., facial recognition information from visitor profiles 137) stored by the local profile database (e.g., local profile database 135). At 417 the remote computing system can identify, categorize or otherwise determine, based on the facial recognition performed at 413, known visitors and unknown visitors among the individuals detected at 409. In some implementations, this may include identifying employees of the business at the location 111, and categorizing them as non-visitors. At 421, the remote computing system generates new visitor profiles for the unknown visitors. For example, individuals having a profile pre-stored in the local profile database can be deemed, categorized, or identified as known visitors and individuals lacking any profile in the local profile database can be deemed, categorized, or identified as unknown visitors. At 425, the remote computing system can obtain identity information (or identities for short) for the unknown visitors determined at 417 using the one or more input/output devices. For example, the remote computing system 109 can obtain identity information for the new visitors when they interact with an automated teller machine or a cashier system; for instance, when they input or provide name, address, and/or credit card information, or when they swipe a bank card or credit card that identifies them.

At 429, the remote computing system can determine identities of the known visitors by accessing their identity information from the visitor profiles stored by the local profile database, which stores the facial recognition information in association with the identity information for each known visitor. At 433, the remote computing system can obtain personalized information (e.g., personalized information 141) for the known visitors from a central profile database (e.g., central profile database 125) based on the identity information of the known visitors. For example, an information hub (e.g., central computing system 105) can provide personalization information for particular individuals to the local device based on the identity information of the individual obtained at 429. In some implementations, the information hub system may use the identity information (e.g., a visitor's name) to look up or index to the personalization information that it has stored in association with that identity information. At 437, the remote computing system can provide the personalized information to the one or more input/output devices. For example, the remote computing system may display the personalized information to the individual (e.g., individual 115A2) and/or to a customer service representative (e.g., customer service representative 116) using a display device (e.g., I/O device 139). At 441, the remote computing system can update the new and existing visitor profiles using action information that it obtained about individuals 115 in its monitored area. In various implementations, updating a new visitor profile includes creating or generating the new visitor profile for the first time. At 445, the remote computing system van provides the updated visitor profiles to the central computing system.

FIG. 5 shows a flow block diagram illustrating an example of a process 500 for updating image recognition processing information of a number of remote computing systems (e.g., remote computing systems 109B and 109C) by a first client computing system (e.g., remote computing system 109A), in accordance with aspects of the present disclosure. At 501, the first client computing system can provide a new visitor profile or an updated visitor profile to a central computing system (e.g., central computing system 105). For example, the first client computing system can upload the new or updated visitor profile to the central computing system over a network (e.g., network 119), such as the Internet. As noted above, the new visitor profile can include a newly generated profile and associated information obtained by the first remote computing system. The updated visitor profiles can include the existing visitor profiles that have new information added to them by the first client computing system.

At 505, the first client computing system can determine whether it received an update conformation from central computing system in response providing the new or updated visitor profile at 501. If not (e.g., 505 is "No"), then the process 500 may iteratively return to 501. In some cases, mitigation can be initiated after several (e.g., 3) failures to receive an update confirmation. If so (e.g., 505 is "Yes"), then the process 500 may proceed to 509. At 509, the first client computing system can provide a synchronization trigger to the other client computing systems (e.g., remote computing systems 109B and 109C). For example, the synchronization trigger can be an electronic message directed to or broadcast to each of the client computing systems linked to the central computing system. In some implementations, the first client computing system can send the synchronization trigger directly to the other client computing systems. In some implementations, the first client computing system can send the synchronization trigger to the central computing system, from which the synchronization trigger can be pushed or pulled by the other client computing systems. For example, the central computing system can push the synchronization message at predetermined periodic time period, such as every four hours, every eight hours, or every 24 hours. Also, the client computing systems can pull the synchronization message from the central computing system at the periodic time periods.

In response to the synchronization trigger, the respective local visitor profile databases (e.g., local profile databases 135) of the other client computing systems can be updated with the new and updated visitor profile provided at 501. For example, the central computing system may distribute, transmit, download or otherwise provide copies of the new updated visitor profiles to the client computer systems for storage in their local profile databases 137. After obtaining the new or updated visitor profile, the other client computing systems can provide update confirmations to the first client computing system, either directly or through the central computing system. At 513, the first client computing system can determine whether it has received update confirmations from all the other client computing systems. If not (e.g., 513 is "No"), then the process 500 may iteratively return to 509. In some cases, mitigation can be undertaken after several (e.g., 3) failures to receive an update confirmation at 513. If so (e.g., 509 is "Yes"), then the process 500 may end.

FIG. 6 shows a swim-lane flow diagram illustrating an example of a process 600 for efficiently updating profiles including image recognition information among a number of remote computing systems (e.g., remote computing systems 109), in accordance with aspects of the present disclosure. As previously detailed herein, the remote computing systems can be operatively and communicatively coupled to a central computing system (e.g., central computing system 105) via one more communication links (e.g., communication links 117) and networks (e.g., network 1). As illustrated in FIG. 6, at 613, remote computing systems 109A can perform facial recognition of individuals (e.g., individuals 115A1 . . . 115A3) in its respective areas (e.g., area 111A). At 617, the remote computing system 109A identifies the individuals of 613 using the visitor profiles (e.g., attempt of find previously stored identity information that corresponds to the facial recognition information in a visitor profile). At 621, the remote computing system 109A can identify, categorize, or otherwise determine unknown visitors as those individuals lacking an existing visitor profile in the local profile database and/or for which facial recognition was unsuccessful. At 625 the remote computing system 109A can create new profiles for the unknown visitors identified at 621. At 629 the remote computing system 109A can obtain personalized information for the known visitors from, for example, the central computing system 105 or another source. At 631 the one or more remote computing system can update the existing and new visitor profiles based on the actions and interactions performed by the individuals in the respective areas. At 635, the remote computing system 109A provides (e.g., uploads) the new and updated profiles to central computing system 105.

At 637, the central computing system 105 receives the new and updated profiles from the remote computing system 109A. At 639, the central computing system 105 updates its central profile database (e.g., central profile database 125) with the new updated profile received at 637. At 641, the central computing system 641 can provide a confirmation to the remote computing system 109 confirming that the central computing 641 received the new and updated provides at 637 and updated the profile database.

At 643, the remote computing system 109A can receive and check the confirmation sent by the central computing system 105 at 641. At 645 the remote computing system 109A, in response to checking the received confirmation at 643, can provide a synchronization trigger to other remote computing systems 109B and 109C.

At 647, the other remote computing systems 109B and 109C can receive the synchronization trigger sent by the remote computing system 109A at 645. At 649, in response to receiving the synchronization trigger at 647, the remote computing systems 109B and 109C can update their local profile databases (e.g., local profile databases 135). In some implementations, the remote computing systems 109B and 109C can obtain (e.g., request or download) the new and update visitor profiles form the central computing system 105. In some implementations, the central computing system 105 can distribute, provide access to, or send some or all of the updated profiles stored at 643 to the remote computing systems 109B and 109C. In some implementations, the central computing system 105 may also distribute un-updated profiles with the updated profiles; e.g., may distribute copies of all of its visitor profiles together.

At 651, the remote computing systems 109B and 109C can provide a confirmations to the remote computing system 109A confirming that they received the new and updated provides at 637 and updated their visitor profile databases at 649. In some implementations, the confirmations sent at 649 can be sent directly to the remote computing system 109A. In some implementations, the confirmations sent at 649 can be sent indirectly to the remote computing system 109A through the central computing system 105. At 655, the remote computing system 109A can receive and check the confirmation provided by the remote computing systems 109A and 109B at 651. If the check at 655 determines that all the confirmations have been received from all the remote computing systems 109B and 109C, the process 600 ends.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing examples of implementations, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What we claim is:

1. A method, comprising:
receiving, by a processor of a first client computing system from a plurality of client computing systems at a location, image data of a plurality of individuals at the location;
   wherein the plurality of client computing systems is communicatively linked to a central computing system;
   wherein the image data is obtained by utilizing one or more image sensors;
detecting, by the processor, a plurality of individuals from the image data at the location;
performing, by the processor, facial recognition, using a facial recognition systems, on the plurality of individuals based on existing visitor profiles stored by a local visitor profile database;
determining, by the processor, at least one known visitor and at least one unknown visitor among the plurality of individuals at the location;
determining, by the processor, identity information of the at least one known visitor based on the existing visitor profiles locally stored on the first client computing system;
receiving, by the processor, personalized information for the at least one known visitor based on the identity information for the at least one known visitor;
   wherein the personalized information is obtained from a credit tracking service, a criminal record service, or a combination thereof;
generating new visitor profiles in the local visitor profile database of the first client computing system for the at least one unknown visitor;
   wherein generating the new visitor profiles comprises capturing unique facial features of the at least one unknown visitor based on the facial recognition and storing the unique facial features of each of the at least one unknown visitor in association with a temporary visitor identification;
obtaining identity information of the at least one unknown visitor at the location using input and output devices;
updating the new visitor profiles in the local visitor profile database of the first client computing system by associating the identity information of the at least one unknown visitor with the unique facial features of the at least one unknown visitor;
creating updated visitor profiles by updating the existing visitor profiles and new visitor profiles based on actions of individuals from the plurality of individuals at the location;
   wherein the actions comprise entering a retail location with a package and leaving the package unattended in the retail location;
providing the new visitor profiles and the updated visitor profiles from the first client computing system to the central computing system; and
receiving at least one confirmation from the central computing system that at least one other client computing system from the plurality of client computing systems received the updated visitor profiles and the new visitor profiles.

2. The method according to claim 1, further comprising displaying, by the processor, the personalized information of the at least one known visitor at the location on a display.

3. The method according to claim 1, further comprising broadcasting, by the processor, at least one synchronization trigger to the at least one other client computing system from the plurality of client computing systems, causing the at least one other client computing system to update their respective local visitor profiles databases with the new visitor profiles and the updated visitor profiles from the first computing system through the central computing system.

4. The method according to claim 1, further comprising sending, by the processor, at least one synchronization trigger to the central computing system, which relays the at least one synchronization trigger to the at least one other client computing system from the plurality of client computing systems.

5. The method according to claim 4, wherein each of the at least one other client computing system from the plurality of client computing systems is configured to perform operations comprising receiving the at least one synchronization trigger.

6. The method according to claim 5, wherein each of the at least one other client computing system from the plurality of client computing systems is configured to perform operations comprising updating a respective local visitor profile database on each of the at least one other client computing system from the plurality of client computing systems with the new visitor profiles and the updated visitor profiles from the first client computing system in response to the at least one synchronization trigger.

7. The method according to claim 4, wherein each of the at least one other client computing system from the plurality of client computing systems is configured to perform operations comprising pushing the at least one synchronization trigger from the central computing system at predetermined time periods.

8. The method according to claim 7, wherein each of the at least one other client computing system from the plurality of client computing systems is configured to perform operations comprising updating a respective local visitor profile database on each of the at least one other client computing system from the plurality of client computing systems with the new visitor profiles and the updated visitor profiles from the first client computing system in response to the at least one synchronization trigger.

9. The method according to claim 4, wherein each of the at least one other client computing system from the plurality of client computing systems is configured to perform operations comprising pulling the at least one synchronization trigger from the central computing system at predetermined time periods.

10. The method according to claim 9, wherein each of the at least one other client computing system from the plurality of client computing systems is configured to perform operations comprising updating a respective local visitor profile database on each of the at least one other client computing system from the plurality of client computing systems with the new visitor profiles and the updated visitor profiles from the first client computing system in response to the at least one synchronization trigger.

* * * * *